US008661269B2

(12) United States Patent
Ogashiwa

(10) Patent No.: US 8,661,269 B2
(45) Date of Patent: Feb. 25, 2014

(54) IMAGE FORMING DEVICE AND METHOD THEREFOR

(75) Inventor: Akiyoshi Ogashiwa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 576 days.

(21) Appl. No.: 12/949,031

(22) Filed: Nov. 18, 2010

(65) Prior Publication Data

US 2011/0131436 A1 Jun. 2, 2011

(30) Foreign Application Priority Data

Nov. 27, 2009 (JP) ................................ 2009-270007

(51) Int. Cl.
*G06F 1/00* (2006.01)

(52) U.S. Cl.
USPC ........................................................ 713/300

(58) Field of Classification Search
USPC ................................................ 713/300, 323
See application file for complete search history.

(56) References Cited

U.S. PATENT DOCUMENTS

| | | | | |
|---|---|---|---|---|
| 8,010,742 | B2 * | 8/2011 | Molaro et al. | 711/112 |
| 2004/0150678 | A1 * | 8/2004 | Jeong | 345/867 |
| 2006/0242433 | A1 * | 10/2006 | Fu et al. | 713/300 |
| 2009/0207121 | A1 * | 8/2009 | Shih et al. | 345/102 |
| 2009/0254645 | A1 * | 10/2009 | Haustein et al. | 709/223 |
| 2010/0036810 | A1 * | 2/2010 | Wu et al. | 707/3 |
| 2010/0281276 | A1 * | 11/2010 | Chang et al. | 713/300 |

FOREIGN PATENT DOCUMENTS

| | | | |
|---|---|---|---|
| JP | 2004-101919 | * | 4/2004 |
| JP | A-2004-101919 | | 4/2004 |
| JP | 2008-052071 A | | 3/2008 |
| JP | 2008-065274 A | | 3/2008 |

* cited by examiner

*Primary Examiner* — Mohammed Rehman

(74) *Attorney, Agent, or Firm* — Muncy, Geissler, Olds & Lowe, PLLC

(57) ABSTRACT

An image forming device that forms an image on a print medium includes a power saving mode shifting part that shifts a mode of the image forming device to a power saving mode, in which power consumption is decreased, when a set power saving mode shifting time has elapsed during a standby mode, an idle time watching part that measures an idle time in the standby mode from a time of a completion of a previous printing to a time of starting a subsequent printing, a counting part that counts a number of times that the idle time has been equal to or longer than a preset idle reference time, wherein the number of times is a count value, and a shifting time setting part that sets the power saving mode shifting time in response to the count value.

18 Claims, 10 Drawing Sheets

60

| Repeat Count N When Idle Time is Equal to or Greater Than Reference Time | Power Saving Mode Shifting Time [Min.] |
|---|---|
| 0 | 30 |
| 1 | 30 |
| 2 | 20 |
| 3 | 15 |
| 4 | 10 |
| 5 | 5 |
| ≥ 6 | 1 |

Fig. 8

IMAGE FORMING DEVICE AND METHOD THEREFOR

CROSS REFERENCE TO RELATED APPLICATION

The present application is related to, claims priority from and incorporates by reference Japanese Patent Application Number 2009-270007, filed on Nov. 27, 2009.

TECHNICAL FIELD

The present invention relates to an image forming device that has a power saving mode, under which power consumption is reduced while the image forming device stands by. The present invention also relates to a method for the image forming device.

BACKGROUND

Image forming devices, such as a color page printer, a photocopy machine and a multifunction machine, conventionally includes a power saving function. These image forming devices control power consumption by terminating power supply to a thermal fuser that consumes a large amount of electricity and by shifting to a power saving mode when print data is not received from a higher-level device, such as a computer, after elapsing a power saving mode shifting time, which is preset in advance, after completion of a print operation.

Such a technique is disclosed in Japanese Laid-Open Patent Application Publication No. 2004-101919 (herein, JP 2004-101919). According to JP 2004-101919, the image forming device includes means to recognize a day of the week and time and, for such a day of the week and the time, sets a long power saving mode shifting time for a time period with a high usage frequency and a short power saving mode shifting time for a time period with a low usage frequency.

However, in the conventional image forming device described in JP 2004-101919, there is a problem that the power saving mode shifting time continues to be set long even when the actual usage frequency decreases during the time period, in which the usage frequency is assumed to be high, causing unnecessary power consumption. In addition, there is a problem that the power saving mode shifting time continues to be short when the usage frequency coincidentally increases during the time period, in which the usage frequency is assumed to be short, causing the time for the printing to start to be unnecessarily long.

SUMMARY

An image forming device of the present invention that forms an image on a print medium includes a power saving mode shifting part that shifts a mode of the image forming device to a power saving mode, in which power consumption is decreased, when a set power saving mode shifting time has elapsed during a standby mode, during which the image forming device is waiting for print job data, an idle time watching part that measures an idle time in the standby mode from a time of a completion of a previous printing to a time of starting a subsequent printing, a counting part that counts a number of times that the idle time has been equal to or longer than a preset idle reference time, wherein the number of times is a count value, and a shifting time setting part that sets the power saving mode shifting time in response to the count value.

In another aspect, a method of the present invention of determining when to switch to a power saving mode in an image forming device, which forms an image on a print medium, wherein the method includes, shifting a mode of the image forming device to a power saving mode, in which power consumption is decreased, when a set power saving mode shifting time has elapsed during a standby mode, during which the image forming device is waiting for print job data, measuring idle times in the standby mode, wherein each idle time is measured from a time of a completion of a previous print job to a time of starting a subsequent print job, counting a number of times that the idle times have been equal to or longer than a preset idle reference time, wherein the number of times is a count value; and determining the power saving mode shifting time according to the count value, such that a lower count value corresponds to a greater delay in shifting from the standby mode to the power saving mode, and a higher count value corresponds to a shorter delay in shifting from the standby mode to the power saving mode.

The conventional image forming devices have the following problems (a)-(c):

(a) Because the power saving mode is not started unless the preset power saving mode shifting time has elapsed, unnecessary power is consumed while print job data is sparsely received from the higher-level device.

For example, if the power saving mode shifting time is set for 30 minutes, the image forming device is controlled so that, when there is a print operation, the power saving state is not entered for 30 minutes even if there are no subsequent print operations. Therefore, even in the case where the frequency of the print operations is low, unnecessary power is consumed when situations, in which a subsequent print operation is performed just before the 30 minutes elapsed after the completion of a preceding print operation, are repeated, because the power saving mode is not initiated for a long period of time.

(b) In contrast, if the set time is reduced, because the power saving mode can be easily initiated, there is a high possibility that the image forming device is in the power saving mode even when print job data is frequently received from the higher-level device. In such a case, the image forming device needs a time (e.g., 30 seconds) from the power saving mode to heat the fuser and to make ready for a print operation. Therefore, a smooth use of the image forming device is prevented as a wait time for printing increases.

(c) In the conventional image forming device described in Patent JP 2004-101919, there is a problem that the power saving mode shifting time continues to be set long even when the actual usage frequency decreases during the time period, in which the usage frequency is assumed to be high, causing unnecessary power consumption. In addition, there is a problem that the power saving mode shifting time continues to be short when the usage frequency coincidentally increases during the time period, in which the usage frequency is assumed to be short, causing the time for the printing to start to be unnecessarily long.

According to the image forming device of the present invention, a standby mode, under which the image forming device waits for print job data, is watched, and a number of times, in which the time period of the standby mode that reaches and/or exceeds a certain reference time occurs consecutively, is counted. The power saving mode shifting time is set depending on the number of times. Therefore, an appropriate power saving mode shifting time can be set dynamically in response to changes in the frequency of print job data, regardless of a day of the week or a time period.

As a result, there is an advantage to suppress unnecessary power consumption when the frequency of print job data is low and to reduce the waiting time for printing to start when the frequency of print job data increases.

BRIEF DESCRIPTION OF THE DRAWINGS

FIG. 8 is an explanatory diagram showing a power saving mode shifting time decision table in FIG. 7

DETAILED DESCRIPTION OF THE INVENTION

Embodiments of the present application become apparent when the description of the embodiments herein is read with reference to the attached drawings. However, the drawings are for explanatory purposes only and are not intended to limit the scope of the present invention.

Configuration of First Embodiment

Figure 1:
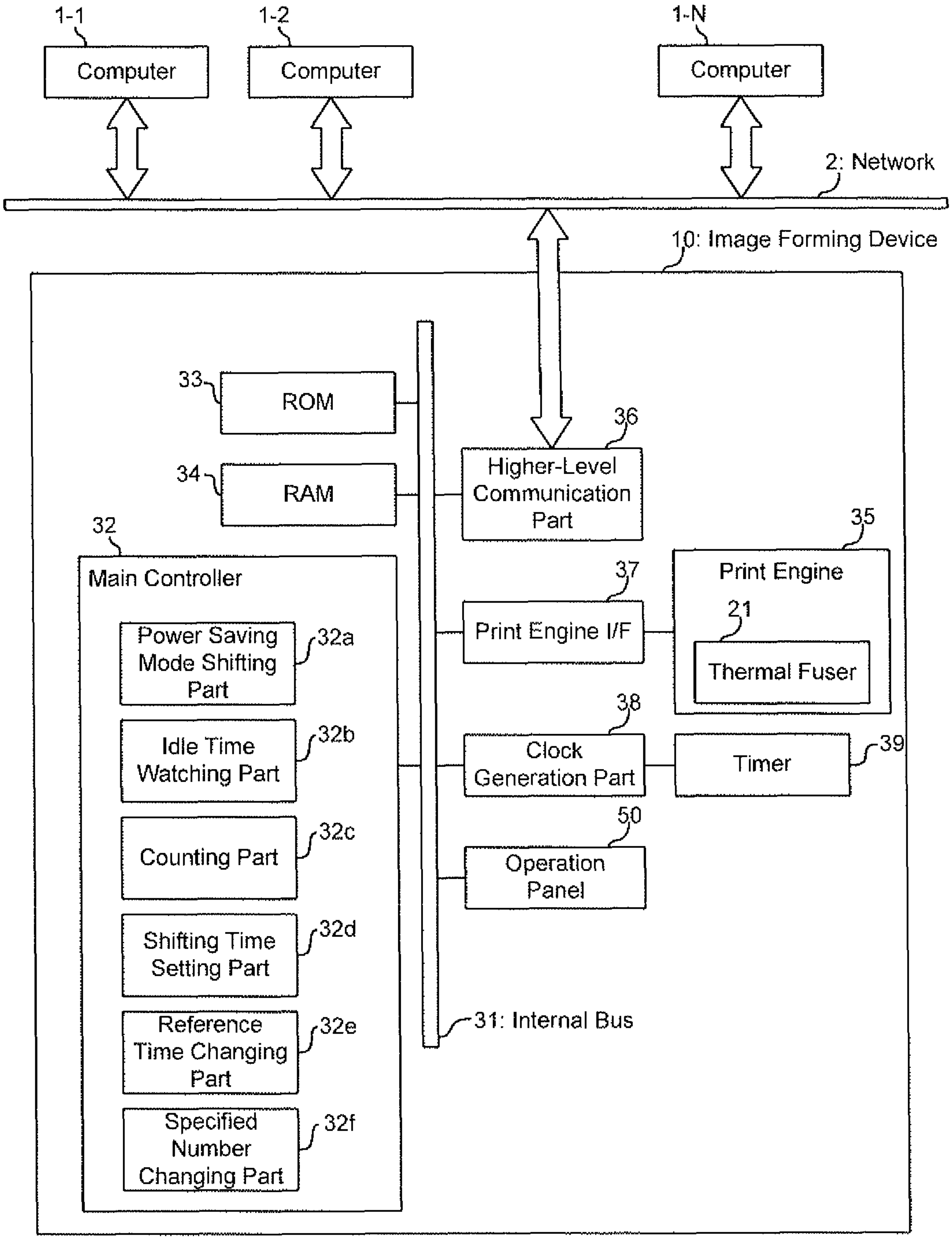
FIG. 1 is the structural diagram schematically showing an image formation system according to a first embodiment the present invention.

FIG. 1 is a structural diagram schematically showing an image formation system according to the first embodiment of the present invention.

In this image formation system, a plurality of computers 1 (1-1, 1-2, . . . , 1-N) and an image forming device 10 are connected so that they can communicate with each other through a network 2. The image forming device 10 is a color page printer, for example, which includes an internal bus 31 that connects various devices within the image forming device 10. To the internal bus 31, a main controller 32 that may control the entire device by a program control is connected. The main controller 32 includes a power saving mode shifting part 32*a*, an idle time watching part 32*b*, a counting part 32*c*, a shifting time setting part 32*d*, a reference time changing part 32*e* and a specified number changing part 32*f*. The main controller 32 may be configured by a central processing unit (CPU) or the like.

The image forming device 10 further includes a read only memory (ROM) 33 that stores programs and data for various controls, a random access memory (RAM) 34 that stores various data, and a thermal fuser 21. The image forming device 10 also includes a print engine 35 that prints print job data (hereinafter referred to simply as "print data"), a higher-level communication part 36 that establishes communication with the higher-level devices, such as the plurality of computers 1, a print engine interface (print engine I/F) 37 that mediates image data transmitted to the print engine 35, a clock generation part 38 that generates a clock, a received data watching timer 39 that measures time until print data is received, and an operation panel 50 that receives user's input and displays messages to the user. These parts are connected to each other through the internal bus 31.

The ROM 33 may be an electrically erasable programmable ROM (EEPROM) that can electrically write and erase data, which may be a nonvolatile memory that is capable of writing and erasing data while mounted on a circuit board.

When the image forming device 10 receives print data at the higher-level communication part 36 from the plurality of computers 1, the image forming device 10 generates image data and transmits a print instruction to the print engine 35 through the print engine I/F 37. The print engine 35 controls the thermal fuser 21 at an appropriate temperature for printing and performs the print operation by forming an image on a print medium (e.g., sheet) P and by fusing the image on the print medium using the thermal fuser 21. After the print operation, the image forming device 10 shifts to the standby mode, under which the thermal fuser 21 is maintained at a certain temperature. When a predetermined time has elapsed under the standby mode, the image forming device 10 shifts to the power saving mode, under which electricity to the thermal fuser 21 of the print engine 35 is cut off to save power consumption.

Figure 2:
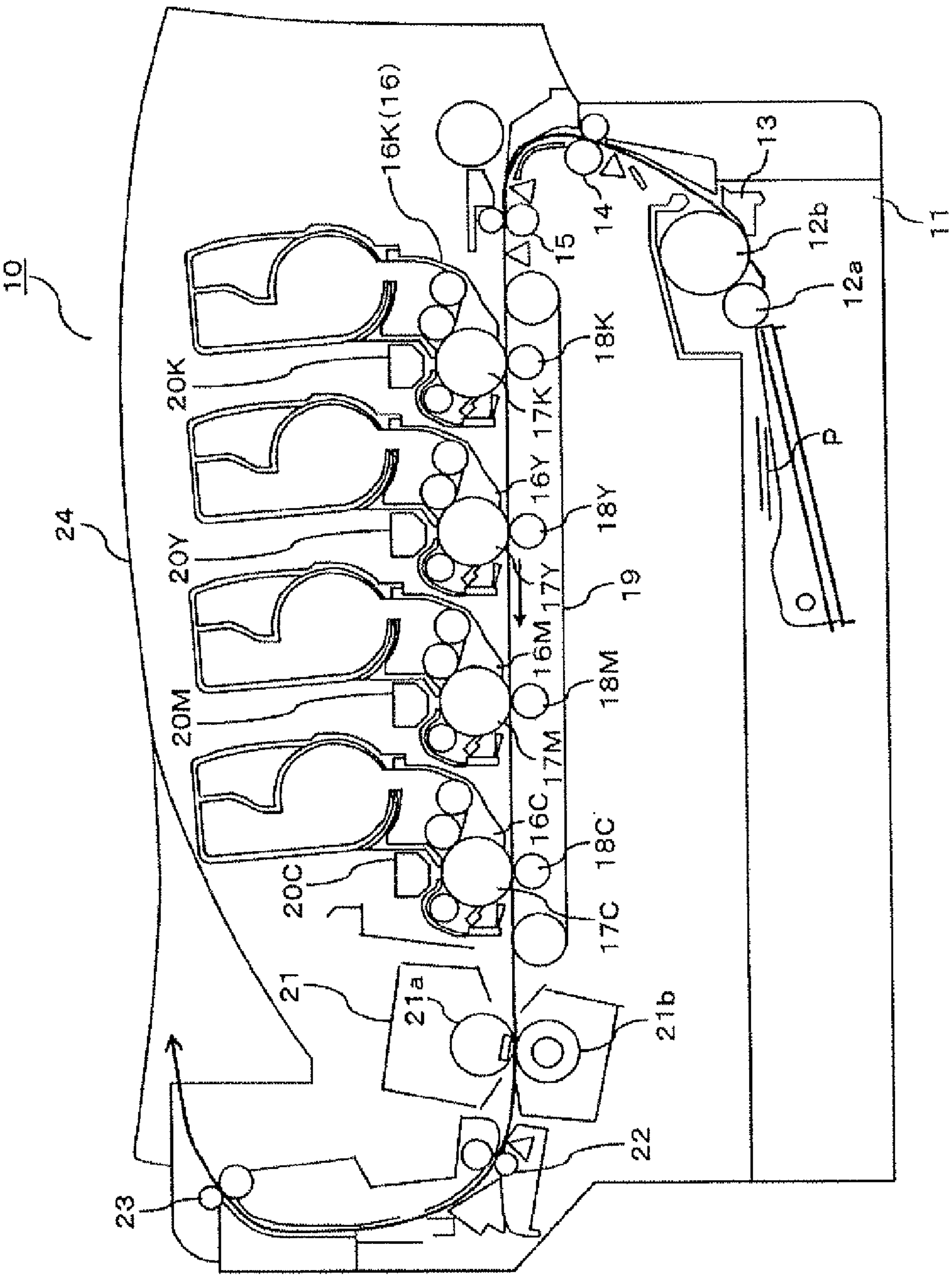
FIG. 2 is a structural diagram schematically showing the image forming device shown in FIG. 1.

FIG. 2 is a structural diagram schematically showing the image forming device shown in FIG. 1. The image forming device 10 includes a sheet supply cassette 11 provided at a lower position inside the image forming device 10. The sheet supply cassette 11 stores sheets P and is provided with a sheet supply mechanism adjacent to the front end of the sheet supply cassette 11. The sheet supply mechanism includes sheet supply rollers 12*a* and 12*b* and a separator 13 and has a configuration to supply sheets P by separating them into individual sheets. A carrying rollers 14 and resist rollers 15 are provided above the sheet supply mechanism.

A plurality of image formation parts 16 (16K, 16Y, 16M and 16C) that form developer images (e.g., toner images) T in black (K), yellow (Y), magenta (M) and cyan (C), respectively, on the sheet P is provided along a carrying direction of the sheet P. Each of the image formation parts 16 is formed by a photosensitive drum 17 (17K, 17Y, 17M and 17C, respectively), a charge device, a developing device and a photosensitive drum cleaning device (not shown). These image formation parts 16 have an integral structure such that each image formation part 16 can be removed from the image forming device 10. For this reason, an upper cover 24 of the image forming device 10 can be opened and closed.

A plurality of exposure devices 20 (20K, 20Y, 20M and 20C) is provided to face the respective photosensitive drums 17 and is supported by an upper cover 24. Each of the exposure devices 20 exposes a surface of the respective photosensitive drum 17 to form an electrostatic latent image thereon and is formed by a light emitting diode array (LED array) or the like. A plurality of transfer rollers 18 (18K, 18Y, 18M and 18C) is positioned to face the respective photosensitive drums 17 across a carrying belt 19.

The thermal fuser 21 that fuses a toner image T on the sheet P is positioned on a downstream side of the carrying belt 19. The thermal fuser 21 is configured to fuse the toner image T on the sheet P onto the sheet P by pressure by a heating roller 21*a*, which is a rotation member, and a pressure application roller 21*b*, which is a rotatable pressure application member. The sheet P that is ejected from the thermal fuser 21 is ejected onto the upper cover 24 by an ejection carrying roller 23 after being carried by ejection rollers 22.

Figure 3:
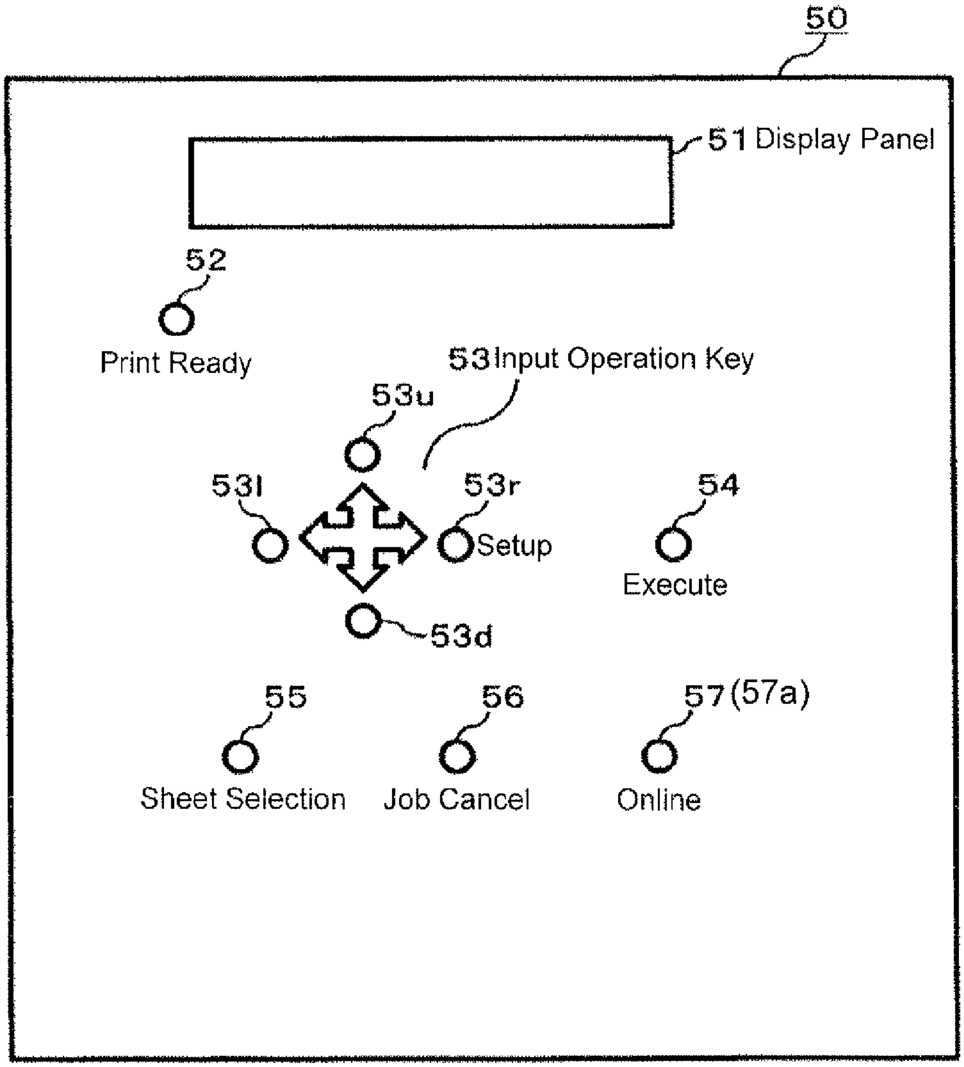
FIG. 3 is a structural diagram showing an example of an operation panel shown in FIG. 1.

FIG. 3 is a structural diagram showing an example of an operation panel shown in FIG. 1. The operation panel 50 includes a display panel 51 that displays messages and guidance from the main controller 32 and the like, a print-ready lamp 52 that indicates that a print operation is possible, a plurality of input operation keys 53 (53*r*, 53*l*, 53*u* and 53*d*) for input operations, an execution key 54, which executes a item selected using the input operation keys 53, a sheet supply selection key 55, which designates a type of sheets to be supplied, a job cancellation key 56, which cancels the print job being executed, and an online key 57 having an online lamp 57*a*, which displays a online or offline status and switches the online status and offline status by depressing the key.

The online key 57 with lamp is referred to as an online lamp 57*a* when referring to display functions and an online key 57 when referring to key functions. The online lamp 57*a* lights up when the image forming device 10 is in the online state and is unlit when it is in the offline state. The input operation key 53*r* also functions as a setup key 53*r*, which requests a setup menu for setting various configurations for the image forming device 10.

Print Operation of First Embodiment

An outline of the print operation by the image forming device 10 according to the first embodiment is explained with reference to FIG. 2.

The sheets P stored in the sheet supply cassette 11 are separated and fed by the sheet supply rollers 12*a* and 12*b* and the separator 13. The sheets P are carried by the carrying rollers 14 and the resist rollers 15 and are fed to the carrying belt 19. The surface of the photosensitive drums 17, which has been charged by the charge device (not shown), is exposed by the exposure device 20 to form respective electrostatic latent images. The electrostatic latent images are developed by the development device (not shown), and the respective toner images T are formed on the photosensitive drums 17.

When the sheet P is conveyed between the photosensitive drums 17 and the transfer rollers 18 by the carrying belt 19, the toner images T in black, yellow, magenta and cyan are sequentially transferred onto the sheet P to form a color toner image T. The toner that remains on a photosensitive drum 17 after the transfer is removed by the photosensitive drum cleaning device (not shown). The sheet P, on which the toner image T has been transferred, is thereafter carried to the fuser 21 that fixes the toner image T. The sheet P, on which the toner image T has been fixed, is ejected and stacked on the upper cover 24 by the ejection carrying rollers 23 after being carried by the ejection rollers 22.

Control Operation of First Embodiment

Figure 4:
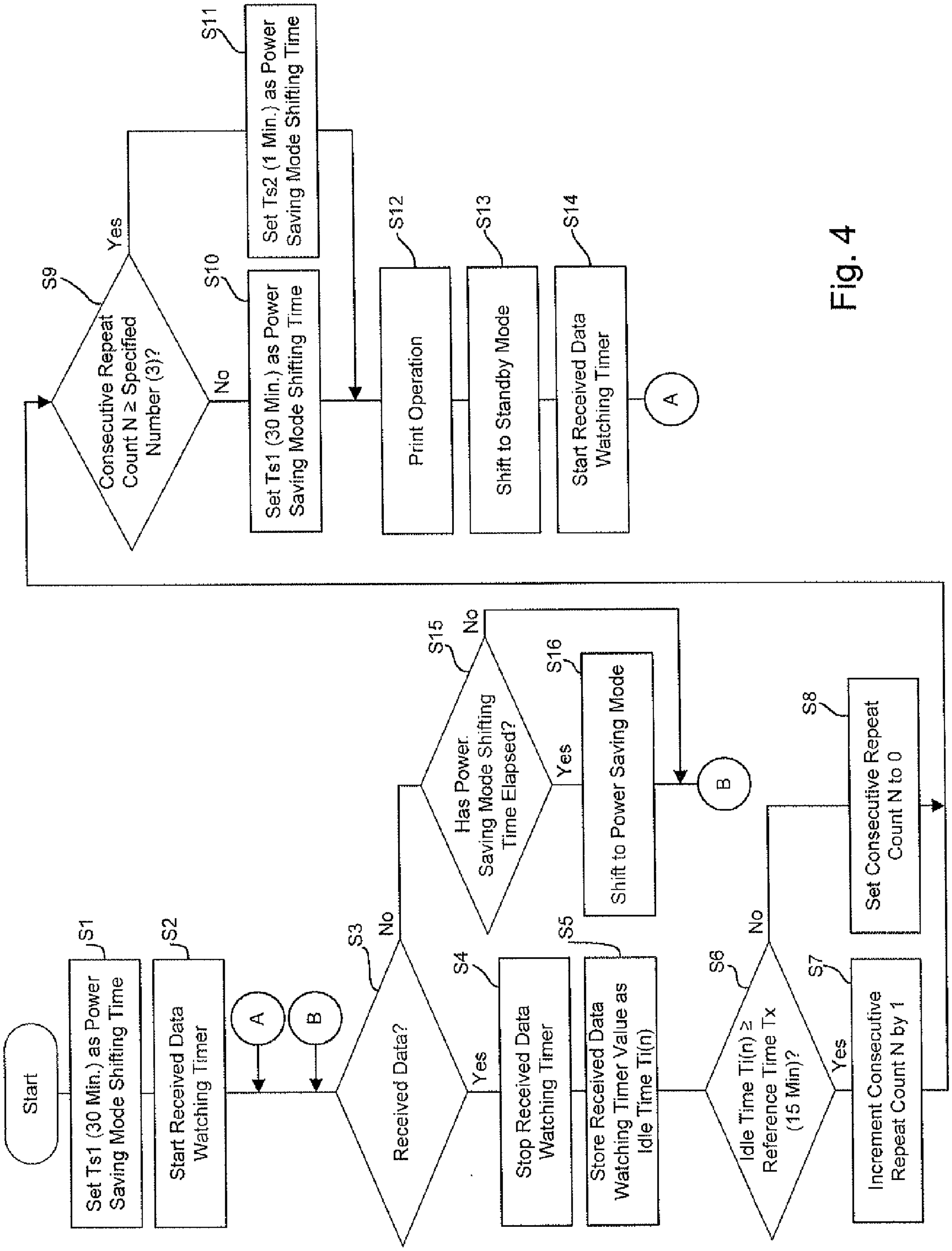
FIG. 4 is a flow diagram showing an operation of the image forming device shown in FIG. 1.

FIG. 4 is a flow diagram showing the operation of the image forming device shown in FIG. 1.

A power saving mode shifting process is commenced when the image forming device 10 is turned on. The power saving mode shifting process is performed by executing a predetermined program stored in the ROM 33 on the main controller 32.

At S1, the power saving mode shifting part 32*a* sets Ts1 (e.g., 30 minutes), which is an initial value for a power saving mode shifting time, and the process continues to S2. At S2, the idle time watching part 32*b* starts a received data watching timer 39 for watching the idle time, and the process continues to S3. The received data watching timer 39 measures time with a clock of the clock generation part 38 shown in FIG. 1.

At S3, a determination is made by the power saving mode shifting part 32*a* as to whether data has been received. If data has been received, the process continues to S4. If no data has been received, the process moves to S13. At S4, the idle time watching part 32*b* stops the received data watching timer 39, and the process continues to S5. At S5, a value of the received data watching timer 39 is stored in the RAM 34 as an idle time Ti(n), and the process continues to S6.

At S6, the idle time watching part 32*b* determines whether the idle time Ti(n) is equal to or greater than an idle reference time Tx (e.g., 15 minutes). If the idle time Ti(n) is equal to or greater than the idle reference time Tx (Yes), the counting part 32*c* increments a consecutive repeat count N by one (1) at S7. If the idle time Ti(n) is less than the idle reference time Tx (15 minutes) (No), the consecutive repeat count is initialized to zero at S8.

At S9, the shifting time setting part 32*d* determines whether the consecutive repeat count N is equal to or greater than a specified number of times (e.g., 3 times). If the consecutive repeat count N is less than the specified number of times (3 times) (No), the process moves to S10. At S10, the shifting time setting part 32*d* sets Ts1 (30 minutes) as the power saving mode shifting time, and the process continues to S12. At S9, if the consecutive repeat count N is equal to or greater than the specified number (3 times) (Yes), the process moves to S11. At S11, the shifting time setting part 32*d* sets Ts2 (e.g., 1 minute) as the power saving mode shifting time, and the process moves to S12.

At S12, the received print data is printed by the print engine 35. When the print engine 35 completes the print operation, the process continues to S13. At S13, the image forming device 10 shifts to the standby mode, under which the thermal fuser 21 is maintained at a certain temperature, and the process continues to S14. At S14, the idle time watching part 32*b* starts the received data watching timer 39, and the process returns to S3.

At S3, if the power saving mode shifting part 32*a* determines that no data has been received, the process jumps to S15. At S15, the power saving mode shifting part 32*a* determines whether the power saving mode shifting time Ts1 or Ts2 has elapsed. If the power saving mode shifting time Ts1 or Ts2 has elapsed (Yes), the process continues to S16. At S16, the power saving time shifting part 32*a* executes the shifting to the power saving mode to suppress the power consumption by cutting off electricity to the thermal fuser 21 of the print engine 35, and the process returns to S3. If the power saving mode shifting time Ts1 or Ts2 has not elapsed (No), the process returns to S3. By the above-described process, the power saving mode shifting process according to the first embodiment is completed.

Figure 5:
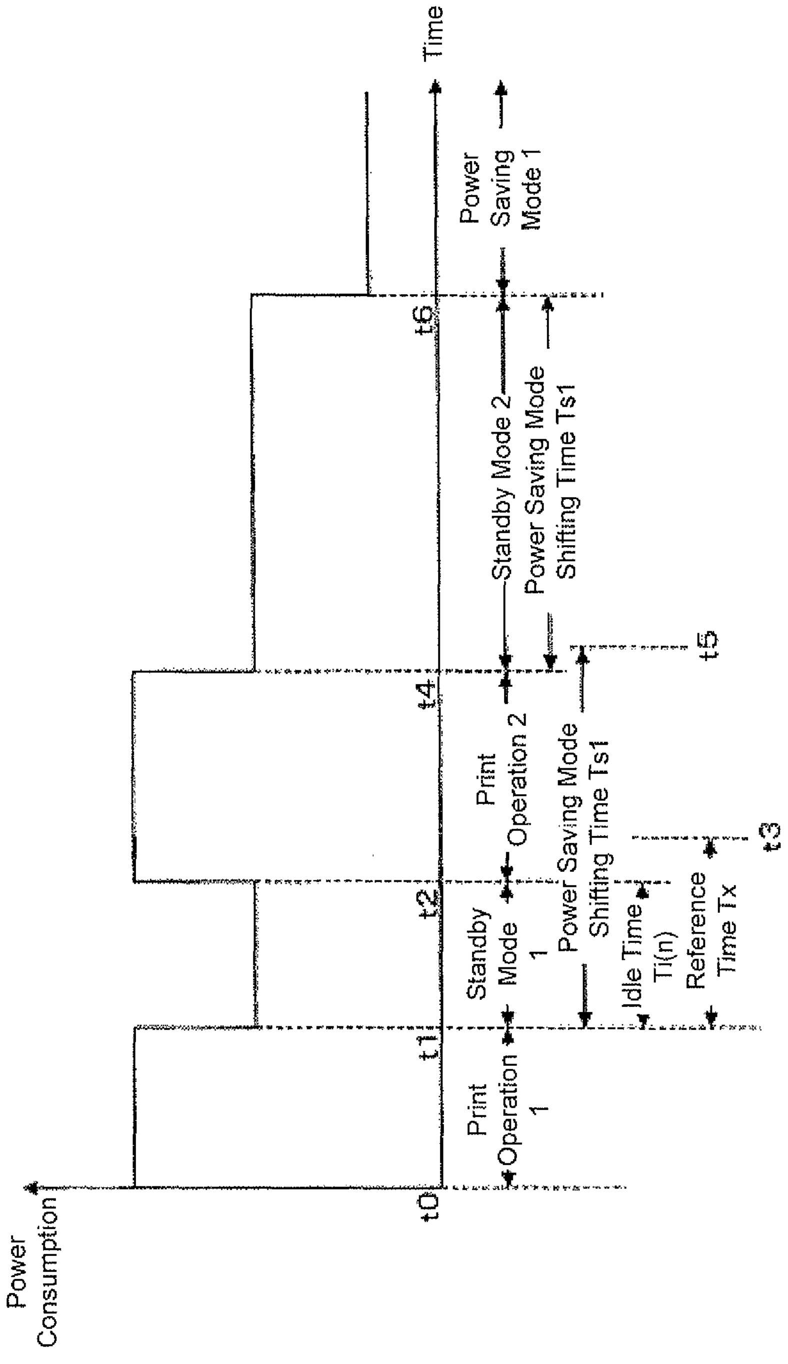
FIG. 5 is a first time chart showing the time when a standby mode is shifted to a power saving mode in the image forming device shown in FIG. 1.

FIG. 5 is a first time chart showing the time when a standby mode is shifted to a power saving mode in the image forming device shown in FIG. 1.

This time chart shows a transition of power consumption by the image forming device 10 when Ts1 (30 minutes) is set as the power saving mode shifting time at S6, S7 and S8 in FIG. 4. In FIG. 5, the numbers referencing the printing operation, standby mode and power saving mode simply show the order of the transition.

The image forming device 10 starts the printing operation 1 at t0 after receiving print data from the computer 1. The print operation 1 is completed at t1 when the printed sheet P is ejected, and the image forming device 10 moves to the standby mode 1, under which the thermal fuser 21 is maintained at a certain temperature. At this time, the idle time watching part 32*b* starts the received data watching timer 39 that measures an idle time. The idle time refers to a time for waiting for the print data.

When the subsequent print data is received, the idle time watching part 32*b* compares the idle time Ti(n) and a reference time Tx (15 minutes). Because the idle time Ti(n) is less than the reference time Tx (15 minutes), the consecutive repeat count N is initialized at zero, and Ts1 (30 minutes=t5) is set as the power saving mode shifting time. The print operation 2 for the subsequent print data is performed from t2.

At t4, the image forming device 10 moves to the standby mode 2 when the print operation 2 is completed, and the power saving mode shifting part 32*a* watches the power saving mode shifting time. If the print data is not received during the set power saving mode shifting time (30 minutes), the electricity to the thermal fuser 21 is cut off, and the image forming device 10 moves to the power saving mode 1, under which the power consumption is saved, at t6.

Figure 6:
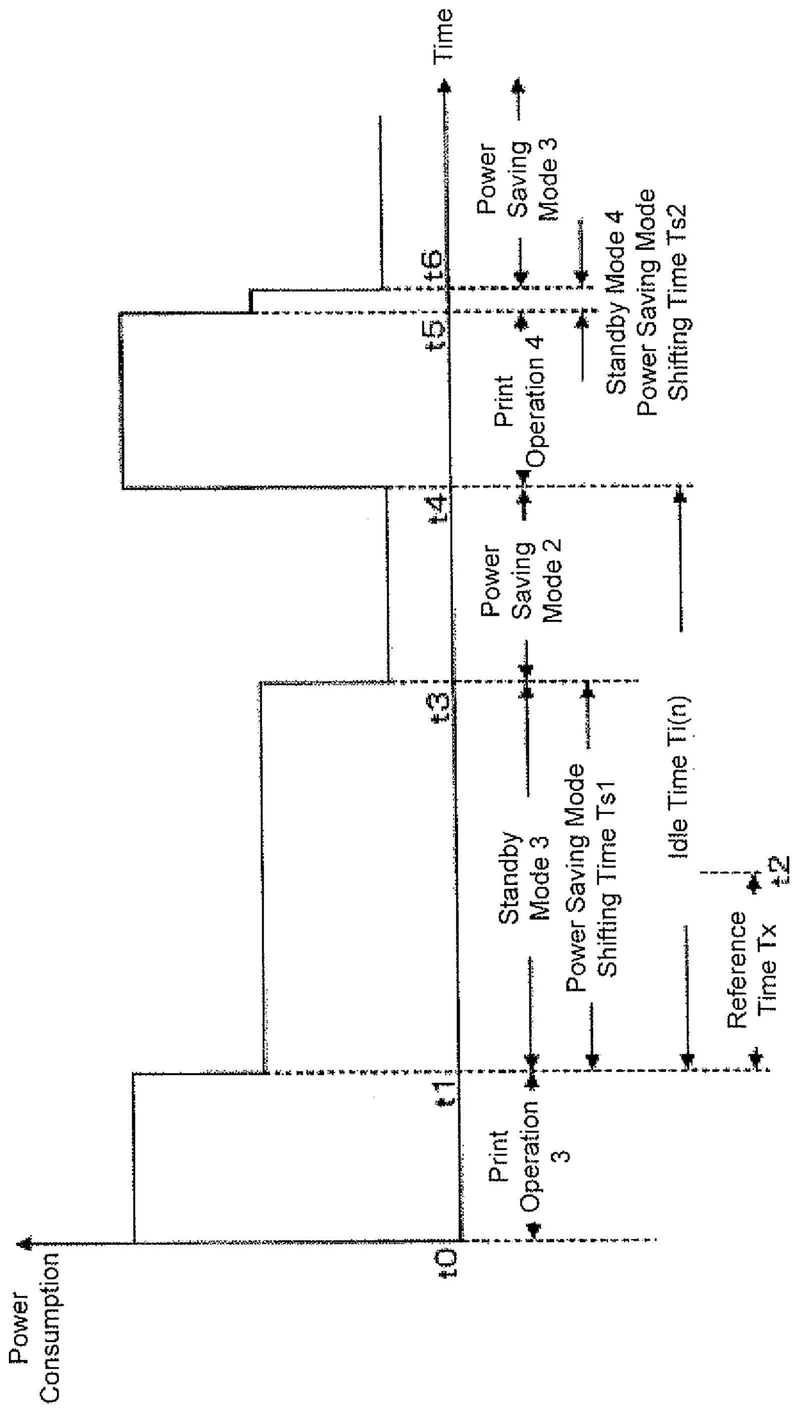
FIG. 6 is a second time chart showing the time when a standby mode is shifted to a power saving mode in the image forming device shown in FIG. 1.

FIG. 6 is a second time chart showing the time when a standby mode is shifted to a power saving mode in the image forming device shown in FIG. 1.

This time chart shows a transition of power consumption by the image forming device 10 when Ts2 (1 minute) is set as the power saving mode shifting time at S6, S7 and S9 in FIG. 4.

The image forming device 10 moves to the standby mode 3 at t1 when the print operation 3 is completed. If the print data is not received during the set power saving mode shifting time (30 minutes), the image forming device 10 moves to the power saving mode 2 at t3. When the print data is received at t4, the idle time Ti(n) (t1 to t4) and the reference time Tx (15 minutes) are compared, and because the idle time Ti(n) is equal to or longer than the reference time (15 minutes), the consecutive repeat count N is incremented by one (1).

When the consecutive repeat count N becomes equal to or greater than a specified number (three), Ts2 (1 minute) is set as the power saving mode shifting time, and the print operation 4 is started at t4. The print operation 4 is completed at t5. After shifting to the standby mode 4, if the print data is not received for the set power saving mode shifting time (1 minute), the image forming device 10 moves to the power saving mode 3 at t6.

In the second time chart in FIG. 6, the idle time Ti(n) is longer than the power saving mode shifting time Ts1 (30 minutes). However, even if the idle time Ti(n) is less than the power saving mode shifting time Ts1 (30 minutes), if the idle time Ti(n) is equal to or longer than the reference time Tx (15 minutes), the consecutive repeat count N may be incremented by one at S6, S7 and S9 in FIG. 4. If the consecutive repeat count N is equal to or greater than the specified number (three), Ts2 (1 minute) is set as the power saving mode shifting time, and the print operation 4 is performed.

(Process for Changing the Values)

In the control operation in the image forming device 10 according to the present embodiment as discussed above, the process is executed by defining values, such as 30 and 15 minutes for the power saving mode shifting time Ts1 and the idle reference time Tx, respectively. These values may be changed depending on the usage condition of the image forming device 10. The process for changing these values is explained below using FIG. 3. The process for changing these values is performed with the main controller 32 by executing a predetermined program stored in the ROM 33.

The values in the present first embodiment include the power saving mode shifting time Ts1 (e.g., 30 minutes), the power saving mode shifting time Ts2 (e.g., 1 minute), the idle reference time Tx (e.g., 15 minutes), and the specified number (e.g., three) for the consecutive repeat count N. Here, a case, in which the specified number for the consecutive repeat count N is changed, is explained. However, other values may be changed using substantially the same method.

Figure 10:
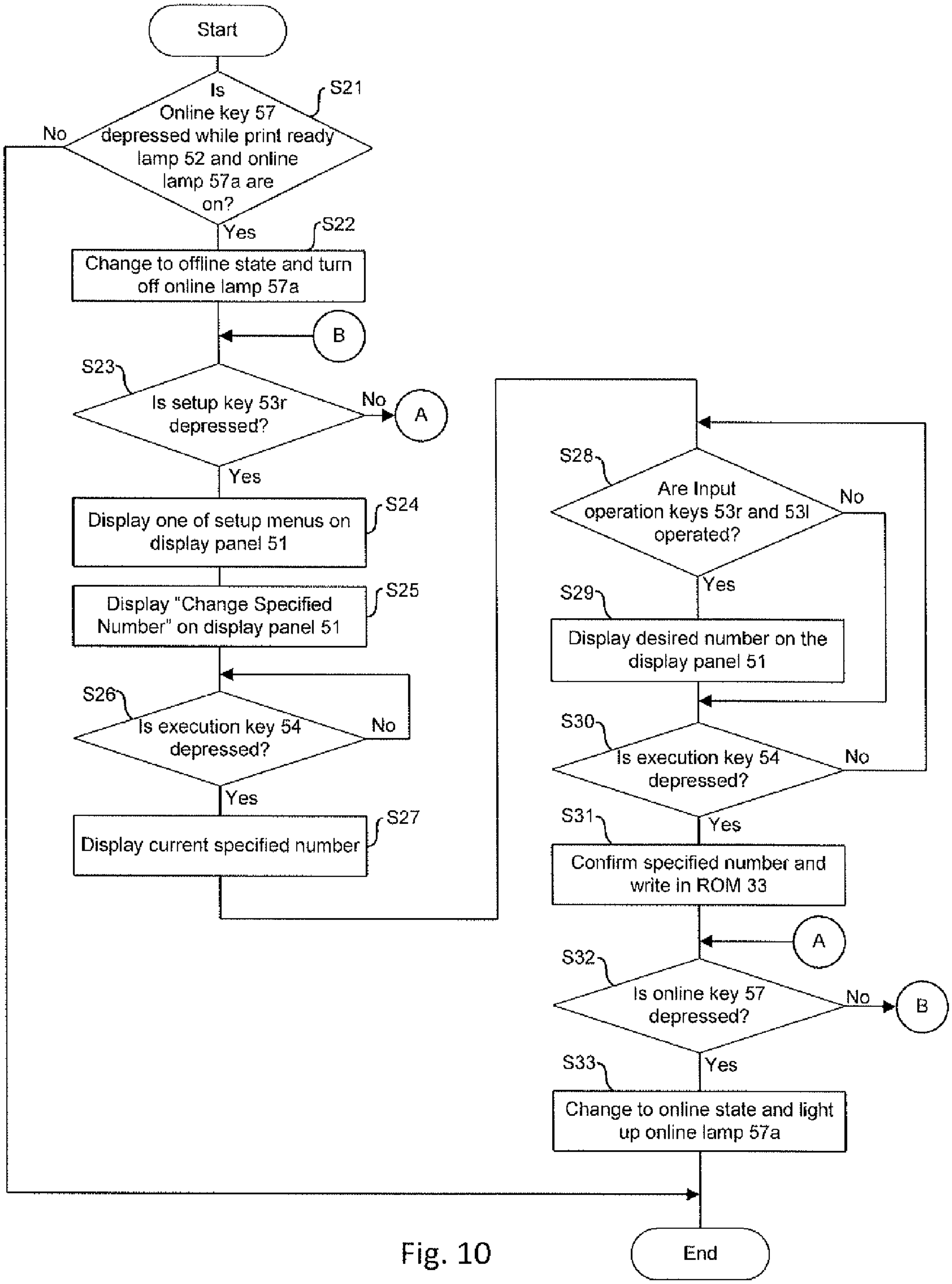
FIG. 10 is a flow diagram showing a process for changing the specified number for the consecutive repeat count N.

The process for changing the specified number for the consecutive repeat count N is performed with the main controller 32 by executing the steps S21-S27 shown in FIG. 10 by the specified number changing part 32*f* stored in the ROM 33.

At S21, it is determined whether the online key 57 is depressed while the print ready lamp 52 and the online lamp 57*a* shown in FIG. 3 are on. If so (Yes, S21), the image forming device 10 enters the offline state, and the online lamp 57*a* lights off at S22. Otherwise, the process ends.

At S23, it is determined as to whether or not the setup key 53*r* is depressed. If so (Yes, S23), one of setup menus is displayed on the display panel 51 at S24. If not (No, S23), the process jumps to S32.

At S25, when the user operates the input operation key 53*r* and the input operation key 531, an item "Change Specified Number" is displayed on the display panel 51. That is, the specified number changing part 32*f* has a function to display an item to the right of the item currently being displayed, by the depression of the input operation key 53*r*, and to display an item to the left of the item currently being displayed, by the depression of the input operation key 531. Thereby, predetermined items are displayed when the user operates these keys.

At S26, it is determined as to whether or not the execution key 54 is depressed. If so (Yes, S26), the specified number for the consecutive repeat count N that is currently set up is displayed as "Specified Number=3" or the like on the display panel 51 at S27.

At S28, it is determined as to whether or not the user has operated the input operation keys 53*r* and 531. If so (Yes at S28), a desired specified number is displayed as "Specified Number=4" or the like on the display panel 51 at step S29. In other words, the specified number changing part 32*f* has a function to increment a value of the specified number by the depression of the input operation key 53*r* and to decrement the value of the specified number by the depression of the input operation key 531. The user operates these keys to display a desired value for the specified number. If it was not determined that the user operated the input operation keys 53*r* and 531, the process jumps to S30.

At S30, it is determined whether the execution key 54 has been depressed. If so (Yes, S30), the specified number is confirmed to be "4" and written in the ROM 33 at S31. If not (No, S30), the process returns to S28. At S32, it is determined as to whether or not if the online key 57 is depressed. If so (Yes, S32), the image forming device 10 enters the online state, and the online lamp 57*a* lights up at S33. If not (No, S32), the process returns to S23.

The idle reference time Tx may also be changed by the reference time changing part 32*e* with substantially the same steps for changing the specified number for the consecutive repeat count N, as discussed above.

Advantages of First Embodiment

The following advantages may be obtained by the image forming device 10 according to the present first embodiment.

As a result of watching the time of the standby mode, during which the data watching timer 39 waits for print data, if the time of the standby mode is continuous and equal to or longer than the certain reference time (e.g., 15 minutes), the consecutive repeat count N is incremented by one. If the consecutive repeat count N becomes equal to or greater than the specified number, the shorter power saving mode shifting time Ts2 (e.g., 1 minute) is set. If the time of the standby mode is less than the certain reference time (e.g., 15 minutes), the longer power saving mode shifting time Ts1 (e.g., 30 minutes) is set. Therefore, an appropriate power saving mode shifting time can be set by dynamically responding to the changes in frequency of the print data, regardless of the day of the week and/or time periods.

Figure 7:
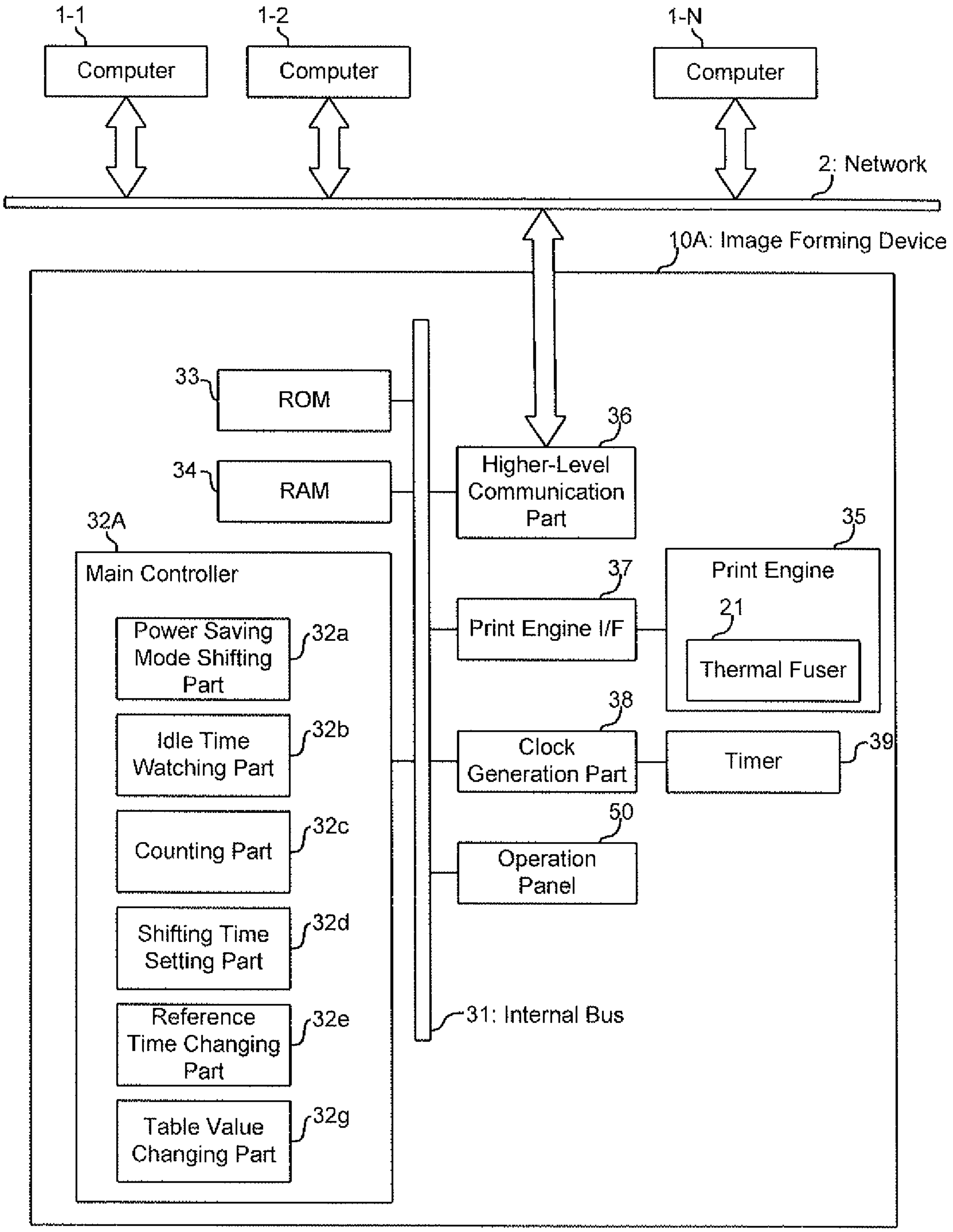
FIG. 7 is a structural diagram schematically showing an image formation system according to the second embodiment of the present invention.

As a result, power consumption is reduced when the frequency of the print data is low, and the waiting time for the printing to start is reduced when the frequency of the print data increases. In other words, a tendency for idle times to be long corresponds to a shorter delay in shifting from the standby mode to the power saving mode, and a tendency for idle times to be short corresponds to a greater delay in shifting from the standby mode to the power saving mode Configuration of Second Embodiment FIG. 7 is a structural diagram schematically showing an image formation system according to the second embodiment of the present invention. In FIG. 7, elements that are common with the elements in FIG. 1 of the first embodiment have the same reference numbers.

In the image formation system according to the second embodiment, a plurality of computers 1 (1-1 to 1-N), which are similar to those of the first embodiment, and an image forming device 10A, which is different from the image forming device 10 of the first embodiment, are connected to each other through the network 2, which is similar to the network of the first embodiment, to allow communication.

In the image forming device 10A, instead of the main controller 32 in the image formation device 10 of the first embodiment, a main controller 32A having a different configuration is provided. In the main controller 32A, instead of the specific number changing part 32*f* in the main controller 32 of the first embodiment, a table value changing part 32*g*, which has a different configuration, is provided. The table value changing part 32*g* has a function to change a value of a power saving mode shifting time decision table 60, which defines a correspondence of the consecutive repeat count N and the power saving mode shifting time. The main controller 32A is configured by a CPU or the like, similar to the first embodiment. The other configurations are the same as the main controller 32.

FIG. 8 is an explanatory diagram showing a power saving mode shifting time decision table, which may be used by the main controller 32A of FIG. 7. The power saving mode shifting time decision table 60 shown in FIG. 8 is stored in the ROM 33, which is a storage part, in FIG. 7 and reflects a relationship between the consecutive repeat count N and the power saving mode shifting time.

Operation of Second Embodiment

Figure 9:
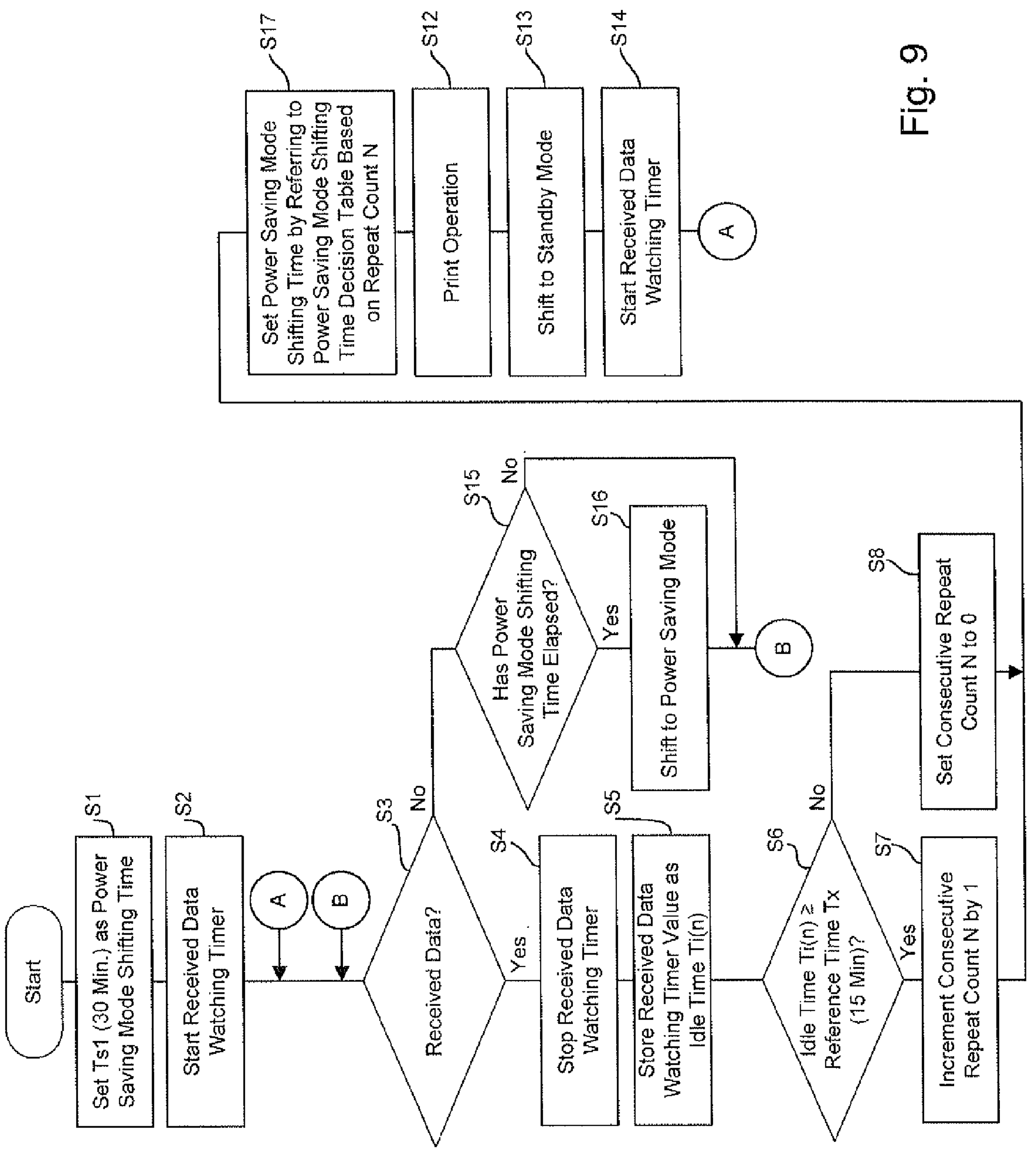
FIG. 9 is a flow diagram showing a control operation of the image forming device shown in FIG. 7.

FIG. 9 is a flow diagram showing an operation of the image forming device shown in FIG. 7. In FIG. 9, elements that are common with the elements in FIG. 4 of the first embodiment have the same reference number.

In the control operation of the flow chart for the second embodiment, instead of steps S7-S9 of FIG. 4 of the first embodiment, step S17, which performs a different process, is provided. Other steps S1-S8 and S12-S16 are the same in the first embodiment.

When the image forming device 10A is turned on, the power saving mode shifting process commences. As in the first embodiment, at S1-S8, the power saving mode shifting time setting process, the received data watching timer starting process, the received data existence determining process, the received data watching timer stopping process, the idle time Ti (n) storing process, and the consecutive repeat count N counting process are performed, respectively.

At S17, a process different from that in the first embodiment is performed. That is, the shifting time setting part 32*d* refers to the power saving mode shifting time decision table 60 shown in FIG. 7 based on the consecutive repeat count N and sets the power saving mode shifting time corresponding to the consecutive repeat count N as the power saving mode shifting time. For example, when the result of the consecutive repeat count N is three, the power saving mode shifting time is 15 minutes.

As in the first embodiment, at S12-S16, the print operation process, the standby mode shifting process, the received data watching time starting process, the power saving mode shifting time progression determining process and the power saving mode shifting process are executed, respectively. By the above processes, the power saving mode shifting process according to the second embodiment is completed.

For the first embodiment, a process for changing the specified number for the consecutive repeat count N was explained. In the second embodiment, the process for changing the values in the power saving mode shifting time decision table 60 may be performed in the substantially same manner as that in the first embodiment, using the table value changing part 32*g*.

Advantages of Second Embodiment

According to the image forming device 10A of the second embodiment, in addition to the advantages of the first embodiment, the power saving mode shifting time is set based on the consecutive repeat count N by providing the power saving mode shifting time decision table 60. Therefore, a finer setting of the power saving mode shifting time can be achieved. As a result, power consumption is reduced when the frequency of the image data is low, and when the frequency of the print data increases, the waiting time is reduced for starting printing.

(Modifications)

The present invention is not limited to the above-described embodiments, and various usages and modifications may be possible. Below (a)-(d) are some the examples of such usages and modifications.

(a) In the first and second embodiments, a color page printer was discussed as the image forming devices 10 and 10A. However, the present invention is not limited to color page printers. The present invention may be implemented in facsimile machines, photocopy machines, multifunction machines, and the like.

(b) It was described that the power saving mode shifting time decision table 60 in the second embodiment is stored in the ROM 33. However, the power saving mode shifting time decision table 60 may be stored in other nonvolatile memories, such as a flash memory, a hard disk or the like.

(c) In the first and second embodiments, the various values are changed by manipulating the operation panel 50. However, the values may be updated by transmitting a new value from the higher-level device, such as the computer 1.

(d) In the first and second embodiments, the power saving mode shifting part 32*a*, the idle time watching part 32*b*, the counting part 32*c*, the shifting time setting part 32*d*, the reference time changing part 32*e* and the specified number changing part 32*f* may be included as parts of the main controller 32 or may have physical structures that are independent from each other.

What is claimed is:

1. An image forming device that forms an image on a print medium, comprising:

a power saving mode shifting part that shifts a mode of the image forming device to a power saving mode, in which power consumption is decreased, when a set power saving mode shifting time has elapsed during a standby mode, during which the image forming device is waiting for print job data;

an idle time watching part that measures an idle time period in the standby mode from a time of a completion of a previous printing to a time of starting a subsequent printing;

a counting part that counts a number of times that the idle time period has been equal to or longer than a preset idle reference time, wherein the number of times is a count value; and a shifting time setting part that sets the power saving mode shifting time in response to the count value.

2. The image forming device according to claim 1, wherein the shifting time setting part shortens the power saving mode shifting time when the count value is equal to or greater than a preset specified number, and lengthens the power saving mode shifting time and sets the count value at an initial value when the count value is less than the preset number.

3. The image forming device according to claim 2, further comprising a specified number changing part that changes the initial value of the specified number.

4. The image forming device according to claim 1, further comprising:

a storage part that stores a correspondence table that corresponds the count value and the power saving mode shifting time, wherein the shifting time setting part refers to the correspondence table and sets the power saving mode shifting time according to the table based on the count value.

5. The image forming device according to claim 4, further comprising a table value changing part that changes a table value of the correspondence table.

6. The image forming device according to claim 1, further comprising a reference time changing part that changes the preset idle reference time.

7. The image forming device according to claim 1, wherein the power saving mode shifting time shuts off power to a thermal fuser, which prevents power to the print medium, when the set power saving mode shifting time has elapsed.

8. The image forming device according to claim 1, wherein the shifting time setting part sets the power saving mode shifting time to a shifting time that is shorter than a first shifting time when the count value of the counting part is changed from an initial value to a predetermined number of times that exceeds the count value for a single counting, and the shifting time setting part sets the count value to the initial value and sets the power saving mode shifting time to the first shifting time when the idle time period of the idle time watching part becomes less than the preset idle reference time.

9. The image forming device according to claim 8, wherein when the power saving mode shifting time is the first shifting time or shorter:

the shifting time setting part sets the count value to the initial value when the idle time period of the idle time watching part becomes less than the preset idle reference time.

10. The image forming device according to claim 1, wherein the counting part further determines whether the idle time period is equal to or longer than the preset idle reference time, and the number of times which the counting part counts are based on when the idle time period has been determined to be equal to or longer than the preset idle reference time.

11. A method of determining when to switch to a power saving mode in an image forming device, which forms an image on a print medium, wherein the method comprises:

shifting a mode of the image forming device to a power saving mode, in which power consumption is decreased, when a set power saving mode shifting time has elapsed during a standby mode, during which the image forming device is waiting for print job data;

measuring idle time periods in the standby mode, wherein each idle time period is measured from a time of a completion of a previous print job to a time of starting a subsequent print job;

counting a number of times that the idle time periods have been equal to or longer than a preset idle reference time, wherein the number of times is a count value; and determining the power saving mode shifting time according to the count value, such that a lower count value corresponds to a greater delay in shifting from the standby mode to the power saving mode, and a higher count value corresponds to a shorter delay in shifting from the standby mode to the power saving mode.

12. The method according to claim 11, further comprising shortening the power saving mode shifting time when the count value is high, and lengthening the power saving mode shifting time when the count value is low, according to a predetermined criterion.

13. The method according to claim 11, further comprising shortening the power saving mode shifting time when the count value is equal to or greater than a preset specified number, and by lengthening the power saving mode shifting time when the count value is less than the specified number.

14. The method according to claim 11, further comprising:

storing a correspondence table that represents a relationship between the count value and the power saving mode shifting time, and referring to the correspondence table to determine the power saving mode shifting time according to the count value.

15. The method according to claim 11, further comprising reducing power to a thermal fuser, which reduces power to the print medium, when the set power saving mode shifting time has elapsed.

16. The method according to claim 11, wherein setting the power saving mode shifting time to a shifting time that is shorter than a first shifting time when the count value of the counting step is changed from an initial value to a predetermined number of times that exceeds the count value for a single counting, and setting the count value to the initial value and setting the power saving mode shifting time to the first shifting time when the idle time period becomes less than the preset idle reference time.

17. The method according to claim 16, wherein when the power saving mode shifting time is the first shifting time or shorter:

setting the count value to the initial value when the idle time period becomes less than the preset idle reference time.

18. The method according to claim 11, wherein the counting part further determines whether the idle time period is equal to or longer than the preset idle reference time, and the number of times which are counted are based on when the idle time period has been determined to be equal to or longer than the preset idle reference time.

* * * * *